United States Patent
Levin (10) Patent No.: US 9,157,761 B2
(45) Date of Patent: Oct. 13, 2015

(54) ARRANGEMENT IN A VEHICLE FOR PROVIDING VEHICLE DRIVER SUPPORT, A VEHICLE, AND A METHOD FOR PROVIDING VEHICLE DRIVER SUPPORT

(71) Applicant: VOLVO CAR CORPORATION, Gothenburg (SE)

(72) Inventor: Daniel Levin, Gothenburg (SE)

(73) Assignee: Volvo Car Corporation (SE)

( * ) Notice: Subject to any disclaimer, the term of this patent is extended or adjusted under 35 U.S.C. 154(b) by 0 days.

(21) Appl. No.: 14/481,141

(22) Filed: Sep. 9, 2014

(65) Prior Publication Data
US 2015/0081202 A1 Mar. 19, 2015

(30) Foreign Application Priority Data
Sep. 19, 2013 (EP) .................................... 13185078

(51) Int. Cl.
G01C 21/00 (2006.01)
G08G 1/123 (2006.01)
G01C 21/36 (2006.01)
G08G 1/16 (2006.01)
B60W 30/18 (2012.01)

(52) U.S. Cl.
CPC ............ *G01C 21/3697* (2013.01); *G08G 1/162* (2013.01); *G08G 1/166* (2013.01); *G08G 1/167* (2013.01); *B60W 30/18163* (2013.01)

(58) Field of Classification Search
CPC ......... G08G 1/16; G08G 1/167; G08G 1/166; G08G 1/162; B60T 8/60; G06F 17/00; G06F 7/00; G01S 13/93; G06G 7/70; B60K 41/20; B60K 31/00; B60R 21/00; G05D 1/00; G06N 5/02; G01C 21/3697; G01C 21/30; G01C 21/362; G01C 21/3661; B60W 30/18163; G07C 5/008
USPC ........ 701/301, 300, 96, 1, 52, 8, 461; 342/70; 348/148; 340/903, 436, 995.12; 303/175
See application file for complete search history.

(56) References Cited

U.S. PATENT DOCUMENTS

| | | | |
|---|---|---|---|
| 2004/0181339 A1* | 9/2004 | Mukaiyama | 701/301 |
| 2007/0192030 A1* | 8/2007 | Tanimichi et al. | 701/301 |
| 2013/0054106 A1* | 2/2013 | Schmudderich et al. | 701/96 |
| 2015/0046022 A1* | 2/2015 | Bai et al. | 701/31.5 |

FOREIGN PATENT DOCUMENTS

| | | | |
|---|---|---|---|
| JP | 405104993 | * | 4/1993 |
| JP | 2005-112101 | * | 5/2005 |

* cited by examiner

*Primary Examiner* — Muhammad Shafi
(74) *Attorney, Agent, or Firm* — Brooks Kushman P.C.

(57) ABSTRACT

An arrangement, a vehicle and a method for providing vehicle driver support during manual or semi-autonomous driving in a potential overtake scenario are provided. The arrangement includes a detector, a communication unit arranged to receive from a preceding vehicle information of a probable route of the preceding vehicle based on at least one of preceding vehicle historical route information and preceding vehicle navigation system information, a processing unit arranged to determine, for one or more routes ahead of the host vehicle, the probability that the preceding vehicle will drive along the one or more route, to process the received information into a format suitable for display, and to display the processed information, thereby providing support to the vehicle driver.

20 Claims, 4 Drawing Sheets

ARRANGEMENT IN A VEHICLE FOR PROVIDING VEHICLE DRIVER SUPPORT, A VEHICLE, AND A METHOD FOR PROVIDING VEHICLE DRIVER SUPPORT

CROSS-REFERENCE TO RELATED APPLICATIONS

This application claims foreign priority benefits under 35 U.S.C. §119(a)-(d) to European patent application number EP 13185078.6, filed Sep. 19, 2013, which is incorporated by reference in its entirety.

TECHNICAL FIELD

Embodiments herein relate to an arrangement in a vehicle for providing vehicle driver support. Embodiments herein further relate to a vehicle comprising an arrangement in a vehicle for providing vehicle driver support and to a method for providing vehicle driver support.

BACKGROUND

When driving along a route on a road, it is common that a vehicle catches up to another slower vehicle which is driving along the same route in the same direction. In case the road has at least two lanes in the same direction, the faster vehicle may change lane in order to pass the slower vehicle in an adjacent lane.

If a driver of a vehicle is catching up to a slower vehicle on a road with only one lane in each direction, or on a road with a broad common lane for two different driving directions, the driver may intend to overtake the slower vehicle ahead using a lane, or part of a lane, which is normally used by oncoming vehicles, driving in the opposite direction.

During relatively straight road sections, where the vehicle driver can see the road well ahead of his/her vehicle, an overtake of a slower driving vehicle ahead is often relatively easy. During less favorable circumstances, it may be more hazardous to perform an overtake of a vehicle ahead. On winding roads, it may be difficult to overlook the entire distance required for the overtake, since curves and brows of a hill may decrease a visible road section ahead. During conditions with reduced sight, such as during dusk, dawn, night, rain or fog, it may be difficult both to gain sight of the road ahead and to estimate a distance to a detected oncoming vehicle.

It may also be a challenge for a driver to overtake a large vehicle ahead, such as a truck, bus or tractor, since a long vehicle ahead requires longer passing time, and since a broad vehicle ahead may occupy a large portion of a width of the road. In addition, large vehicles may obstruct a big part of the view for a vehicle approaching from the rear.

A situation in which a driver of a faster vehicle catches up to a slower vehicle on a road section where an overtake is difficult or hazardous may be frustrating for the driver in the faster vehicle. If he/she is stressed or inexperienced, there may be a risk that he/she initiates an overtake although conditions are less than optimal if he/she believes that a considerable time amount is gained thanks to the overtake. Thus, improvements in the field of vehicle safety in overtaking scenarios are desirable.

SUMMARY

Embodiments herein aim to provide an arrangement in a vehicle for providing vehicle driver support eliminating or at least reducing the problems and/or drawbacks associated with overtaking scenarios.

According to an embodiment, this is provided by an arrangement in a vehicle for providing vehicle driver support during manual or semi-autonomous driving in a potential overtake scenario, wherein the arrangement comprises:

a detector, arranged to detect at least one of a closing velocity between the host vehicle and a preceding vehicle and a distance between the host vehicle and the preceding vehicle;

a communication unit, arranged to receive from the preceding vehicle information of a probable route of the preceding vehicle based on at least one of preceding vehicle historical route information and preceding vehicle navigation system information;

a processing unit, arranged to; receive information indicative of at least one of a closing velocity between the host vehicle and the preceding vehicle and a distance between the host vehicle and the preceding vehicle from the detector; trigger the communication unit to receive information on a probable route of a preceding vehicle if a detected closing velocity between the host vehicle and the preceding vehicle is above a threshold closing velocity or if a detected distance between the host vehicle and the preceding vehicle is below a threshold distance; determine, for one or more routes ahead of the host vehicle, the probability that the preceding vehicle will drive along the one or more route, the determination being based on at least one of received preceding vehicle historical route information data and received preceding vehicle navigation system information, and to process the received information into a format suitable for display; and one or more display units, arranged to receive determined preceding vehicle route information from the processing unit and to display the processed information;

thereby providing support to the vehicle driver.

Since the probability that the preceding vehicle will drive along the one or more route ahead of the host vehicle is determined and arranged to be displayed, the vehicle driver is supported such that unnecessary overtaking's may be avoided.

An "unnecessary overtake" may be an overtake that a driver of the host vehicle wouldn't have performed if he/she had known that a route of a preceding vehicle coincides with the host vehicle route only for a relatively short distance ahead of the host vehicle. An "unnecessary overtake" may also be an overtake which results in a relatively small saving of time compared with a scenario wherein no overtake was performed.

In a scenario wherein the driver of a host vehicle approaches a slower vehicle from behind on a road, i.e., a preceding vehicle, he/she may lower a host vehicle speed into a speed which is substantially the same or lower than the speed of the preceding vehicle. Alternatively, the driver of the host vehicle may overtake the preceding vehicle by keeping a current speed or accelerate into a higher speed than the speed of the preceding vehicle. During an overtake a host vehicle driver often accelerates in order to speed up the overtake and thereby decrease the time and distance needed for the overtake.

In the scenario wherein the driver of a host vehicle approaches a slower driving vehicle from behind, the host vehicle driver normally is unaware of the route of the preceding vehicle, i.e., which road the driver of the preceding vehicle intends to drive, as well as the intended destination for the preceding vehicle. This lack of information may result in that the host vehicle initiates an overtake although the driver of the preceding vehicle intends to leave the host vehicle route and continue on another route than the host vehicle driver in a relatively short distance, for example within a few hundred meters, a few kilometers or a few tens of kilometers. The saving of time thanks to the overtake may then be relatively small, such as only one or a few per cent or a few ten per cents of the time needed for driving the route.

Since information on a probable route of a preceding vehicle is received, the probability that the preceding vehicle will drive along the one or more route is determined and information indicative thereof is displayed, the driver of a host vehicle is supported. Hereby a decision whether an overtake should be initiated or not is based on a more complete set of parameters.

Thus, hereby is provided an arrangement in a vehicle for providing vehicle driver support during manual or semi-autonomous driving in a potential overtake scenario, eliminating or at least reducing the problems and/or drawbacks associated with overtaking's.

According to some embodiments, probable routes of two or more preceding vehicles are determined.

Since probable routes of two or more preceding vehicles are determined, a host vehicle driver is supported in a situation where he/she decides whether to overtake two or more preceding vehicles. This is very useful in a scenario where the host vehicle approaches two or more vehicles driving on a road ahead of the host vehicle.

According to some embodiments, the communication unit is arranged to send a request to the one or more preceding vehicles in order to receive the information on the one or more probable routes for the one or more preceding vehicles.

Since the communication unit is arranged to send a request to the one or more preceding vehicles in order to receive the route information, the preceding vehicles doesn't have to send out the information continuously but only when a request from another vehicle is received.

According to some embodiments the communication unit is arranged to communicate with other vehicles via vehicle-to-vehicle-communication (V2V).

Since the communication unit in the host vehicle is arranged to communicate with other vehicles via vehicle-to-vehicle-communication (V2V), no external communication equipment is needed for the communication between the vehicles. The vehicles may then share information between them in an easy, reliable and cost efficient manner.

According to some embodiments the communication unit is arranged to communicate with other vehicles via vehicle-to-infrastructure-to-vehicle-communication (V2I2V).

Since the communication unit in the host vehicle is arranged to communicate with other vehicles via vehicle-to-infrastructure-to-vehicle-communication (V2I2V), a reliable communication link may be established between the vehicles even when if a distance between the vehicles increases. The infrastructure may be e.g., roadside units, arranged in the vicinity of a road and arranged to communicate signals between the vehicles. The roadside units may comprise any suitable communication equipment, including senders and receivers. The infrastructure may also be one or more remotely arranged servers, comprising or connected to any suitable communication equipment, including senders and receivers.

According to some embodiments the one or more display units are arranged to display the processed information only if a, by the detector, detected distance between the host vehicle and the preceding vehicle is below a threshold distance.

Since the one or more display units are arranged to display the processed information only if a distance between the host vehicle and the preceding vehicle is below a threshold distance, the vehicle driver is informed only when he/she needs the information. Thanks to this, the driver may be presented with a well-balanced load of information, and the driver doesn't have to pay any attention to information relating to preceding vehicles when no preceding vehicle is within the threshold distance. The threshold distance may be pre-configured or user-configured to any desired distance.

According to some embodiments the arrangement comprises a positioning system connected to a map database, arranged to continuously determine a host vehicle position.

Since the arrangement comprises a positioning system connected to a map database, arranged to continuously determine a host vehicle position, the position of the host vehicle may be displayed on a map. A map database may be e.g., a database comprising map information stored on one or more servers. The map information may comprise information of a host vehicle surrounding, a region, a country or global map information. The information may be provided by a third party. The map database may also be an in-vehicle-stored database and/or a database comprising information collected during routes driven previously by the host vehicle or vehicles connected to the host vehicle.

According to some embodiments the one or more display units are arranged to display the information graphically and where a first graphical element represents the probability that the preceding vehicle will drive along a first route, and a second graphical element represents the probability that the preceding vehicle will drive along a second route.

Since the one or more display units are arranged to display the information graphically with different graphical elements representing different routes, the information that the driver needs in order to make the overtake decision is presented in a clear and concise manner. A graphical element may be e.g., a line, an arrow a dot, a sign or a symbol. For example, an arrow pointing upwards on the display may represent a route or road ahead of the host vehicle. An arrow pointing to the right may represent a route or road turning to the right, or a route or road that follows a route or road ahead and then is turning right from the route or road ahead. The route or road ahead may be the host vehicle route or any other route, such as the largest road or route. A graphical element may also be a number, or a number with a per cent sign, e.g., 10%, 50%, 72% or 100%. The graphical element may then be indicative of the probability that the preceding vehicle will drive along a particular route.

According to some embodiments the host vehicle positioning system connected to the map database is arranged to receive a host vehicle route, the processing unit is arranged to compare the host vehicle route with the determined routes of the one or more preceding vehicles and the one or more display units are arranged to display information indicative of a distance for which the two or more routes coincide.

Since the information is indicative of a distance for which the two or more routes coincide, the vehicle driver may be informed of the distance for which the preceding vehicle will continue to drive in front of the host vehicle. Thereby the driver is supported in a decision whether to overtake the preceding vehicle or not.

According to some embodiments the map database connected host vehicle positioning system is arranged to receive a host vehicle route, the processing unit is arranged to compare the host vehicle route with the determined routes of the one or more preceding vehicles and the one or more display units are arranged to display information indicative of the probability that the one or more preceding vehicles will drive along the host vehicle route for any selected distance along the host vehicle route.

Since information indicative of the probability that the one or more preceding vehicles will drive along the host vehicle route for any selected distance along the host vehicle route is displayed, the driver will be informed of the probability that the preceding vehicle will continue to drive in front of the host vehicle for a selected distance.

If for example, the vehicle driver selects the distance "1 km", he/she may see the probability, e.g., "50%" on a display. Thus, the probability that the preceding vehicle will continue on the host vehicle route for the upcoming kilometer is determined to be 50%. If the vehicle driver instead selects the distance "5 km", he/she may see the probability, e.g., "20%" on a display. Thus, the probability that the preceding vehicle will continue on the host vehicle route for the next 5 kilometers is determined to be 20%.

Thus, hereby is provided an arrangement in a vehicle for providing vehicle driver support during manual or semi-autonomous driving in a potential overtake scenario, eliminating or at least reducing the problems and/or drawbacks described above.

Embodiments herein also aim to provide a vehicle comprising an arrangement for providing a vehicle driver with support during manual or semi-autonomous driving in a potential overtake scenario without the problems or drawbacks described above.

According to some embodiments, this is provided by a vehicle comprising an arrangement for providing vehicle driver support during manual or semi-autonomous driving in a potential overtake scenario according to embodiments disclosed herein. Hereby the vehicle driver is supported such that unnecessary overtaking's may be avoided.

Embodiments herein also aim to provide a method for providing vehicle driver support during manual or semi-autonomous driving in a potential overtake scenario without the problems or drawbacks described above.

According to some embodiments, this is provided by a method for providing vehicle driver support during manual or semi-autonomous driving in a potential overtake scenario, the method comprises;
  detecting, by a detector, at least one of a closing velocity between the host vehicle and a preceding vehicle and a distance between the host vehicle and the preceding vehicle;
  receiving, to the processing unit, information indicative of at least one of a closing velocity between the host vehicle and the preceding vehicle and a distance between the host vehicle and the preceding vehicle from the detector;
  triggering, by the processing unit, the communication unit to receive information on a probable route of a preceding vehicle based on at least one of received preceding vehicle historical route information and received preceding vehicle navigation system information from the preceding vehicle if a detected closing velocity between the host vehicle and the preceding vehicle is above a threshold closing velocity or if a detected distance between the host vehicle and the preceding vehicle is below a threshold distance;
  determining, by the processing unit, for one or more routes ahead of the host vehicle the probability that the preceding vehicle will drive along the one or more route, the determination being based on at least one of received preceding vehicle historical route information data and received preceding vehicle navigation system information;
  processing the received information into a format suitable for display; and
  displaying, by the one or more display units, the processed information.

Since the probability that the preceding vehicle will drive along the one or more route is determined and displayed in the method, the vehicle driver is supported such that unnecessary overtaking's may be avoided.

Further features of, and advantages with, the embodiments herein will become apparent when studying the appended claims and the following detailed description. Those skilled in the art will realize that different features of the embodiments herein may be combined to create embodiments other than those described in the following, without departing from the scope of the appended claims.

BRIEF DESCRIPTION OF THE DRAWINGS

The various aspects of embodiments herein, including its particular features and advantages, will be readily understood from the following detailed description and the accompanying drawings, in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Embodiments herein will now be described more fully with reference to the accompanying drawings, in which example embodiments are shown. However, this application should not be construed as limited to the embodiments set forth herein. Disclosed features of example embodiments may be combined as readily understood by one of ordinary skill in the art to which this application belongs. Like numbers refer to like elements throughout.

Well-known functions or constructions will not necessarily be described in detail for brevity and/or clarity.

Figure 1:
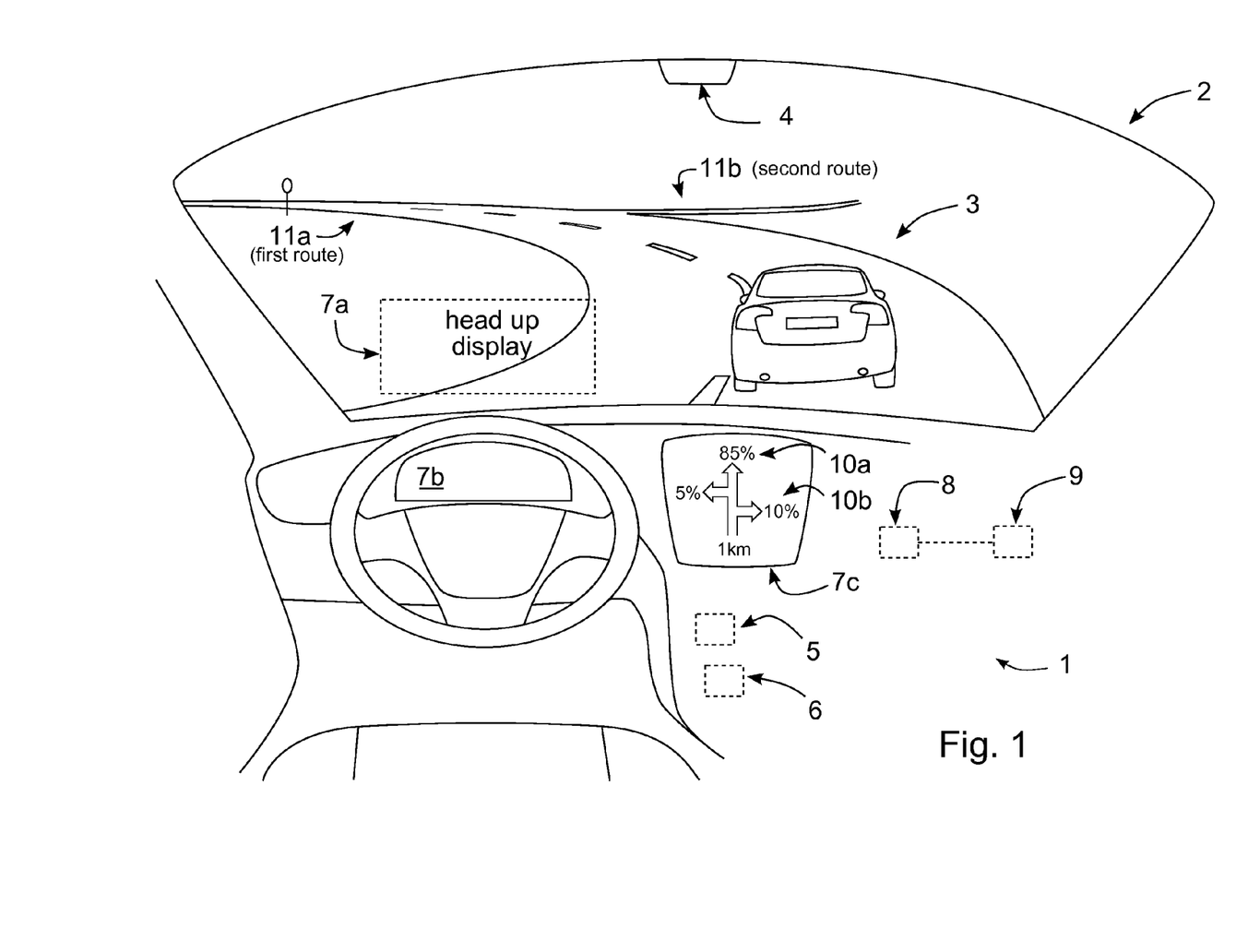
FIG. 1 illustrates a vehicle and an arrangement in the vehicle for providing vehicle driver support during manual or semi-autonomous driving in a potential overtake scenario according to some embodiments.

FIG. 1 illustrates an arrangement 1 in a vehicle 2 for providing vehicle driver support during manual or semi-autonomous driving in a potential overtake scenario. With manual driving, situations are referred to wherein a driver operates driving functions of the vehicle, such as speed, acceleration, braking and steering. During manual driving, the driver may receive input from various vehicle systems, such as information-systems and warning-systems, and the driver may choose if he/she will drive in accordance with received warnings, instructions or the like.

Semi-autonomous driving refers to scenarios where a vehicle is subject to a combined manual and autonomous input during essentially manual driving. During semi-autonomous driving a driver may use vehicle systems which may assist him/her to e.g., keep a selected speed, keep a safety distance to a preceding vehicle, automatically brake in imminent collision scenarios etc., but where the supporting vehicle systems generally are subordinated the control of the driver.

In FIG. 1, the potential overtake scenario is illustrated in a situation where the host vehicle 2 approaches a preceding vehicle 3 from the rear when both vehicles drive along a route or road in a road environment.

The arrangement 1 comprises a detector 4, arranged to detect at least one of a closing velocity between the host vehicle 2 and the preceding vehicle 3 and a distance between the host vehicle 2 and the preceding vehicle 3. In the FIG. 1 illustration the detector 4 is arranged in the vicinity of a host vehicle windshield, but in other embodiments the detector 4 may be arranged in other suitable locations, such as near a vehicle grille or behind a dashboard or centerstack. The location of the detector 4 may depend of the type of detector 4 used.

The detector 4 may be any device suitable for detecting at least one of a closing velocity between the host vehicle 2 and the preceding vehicle 3 and a distance between the host vehicle 2 and the preceding vehicle 3.

The detector 4 may be an image capturing unit, such as a front-facing camera, connected to a processing unit with logic to analyze images taken by the image capturing unit for the determination of the closing velocity and/or the distance to the preceding vehicle 3.

The detector 4 may be a radar transmitter/antenna, using radio waves to determine e.g., a position, direction, or speed of objects. The radar transmitter/antenna may transmit pulses of radio waves or microwaves which bounce off the preceding vehicle 3 in their path. The preceding vehicle 3 then reflects part of the wave's energy to the antenna of the detector 4 which is usually located at the same place as the transmitter of the detector 4. Hereby a closing velocity/a distance may be determined.

The detector 4 may use lidar, (Laser Interferometry Detection and Ranging) for illuminating the preceding vehicle 3 with a laser and analyze the reflected light.

The detector 4 may detect closing velocities and/or distances between vehicles through detecting signals from surrounding vehicles, such as the preceding vehicle 3. If one or more surrounding/preceding vehicles 3 send out information of themselves, this may be detected by the host vehicle detector 4. The detector 4 may comprise or be connected to a communication unit in order to carry out the detection. Signals sent directly from surrounding vehicles (vehicle-to-vehicle—V2V) may be detected by the detector 4.

Also signals sent via an infrastructure may be detected by the detector 4. This may be referred to as vehicle-to-infrastructure-to-vehicle (V2I2V)-communication. The infrastructure may be one or more roadside units arranged to transmit communication between vehicles driving along a road. It may also be one or more external servers, which also may be referred to as a cloud. A mobile network, such as 3G or 4G/LTE may be used for the communication between the host vehicle 2 and the infrastructure and/or surrounding vehicles. According to some embodiments, a combination of V2V and V2I2V may be used.

A communication unit 5 of the arrangement 1 is arranged to receive from the preceding vehicle 3 information of a probable route of the preceding vehicle 3 based on at least one of preceding vehicle historical route information and preceding vehicle navigation system information.

The communication unit 5 may comprise a receiver that receives signals from surrounding vehicles/the preceding vehicle 3 and converts them to information, such as information relating to surrounding/preceding vehicle speed, acceleration, braking, statuses, routes etc. The receiver may also be configured to communicate with infrastructure such as remote servers, databases, clouds and/or roadside units. The communication unit 5 may also comprise a transmitter which converts host vehicle information, e.g., relating to host vehicle speed, acceleration, braking, statuses, routes etc., into a signal, such as an electrical signal and/or a signal carried by electromagnetic waves. Hereby host vehicle information may be distributed to other vehicles and/or infrastructure such as remote servers, databases, clouds and/or roadside units.

Any suitable means may be used for the communication between the host vehicle 2 and other vehicles or infrastructure, e.g., radio signals, such as according to either of standards, such as the GSM, 3G, LTE and/or WiFi standards, and/or satellite communication signals.

The communication unit 5 may receive information of a probable route of the preceding vehicle 3 based on preceding vehicle historical route information received from the preceding vehicle 3. Preceding vehicle historical route information is information relating to routes previously driven by the preceding vehicle 3. The information may have been gathered via a preceding vehicle positioning device connected to a database. The information may be stored in the vehicle or at a remote location, such as a server. The database may e.g., be a database with information gathered by the vehicle, or a map database provided by a third party.

According to some embodiments, the communication unit 5 is connected to the detector 4, thereby allowing the detector 4 to detect signals sent from surrounding/preceding vehicles and communicated to the detector 4 via the communication unit 5.

The arrangement 1 may determine probable future routes for the preceding vehicle 3 from the preceding vehicle historical route information. If the preceding vehicle 3 for example historically has turned right in a T-crossing along the route eight times out of ten, the arrangement 1 may determine that the probability that the preceding vehicle 3 will turn right in the same T-crossing a next time is 80%. If the preceding vehicle 3 then has turned left in a four-way-crossing half of the times earlier, the probability that the preceding vehicle will turn left in the four-way-crossing when driving in front of the host vehicle 2 may be determined to 50%.

The communication unit 5 may receive information on a probable route of the preceding vehicle 3 based on received preceding vehicle navigation system information. If an occupant of the receiving vehicle 3 has inputted a desired driving route in the preceding vehicle navigation system, the arrangement 1 which receives this information may determine that the probability that the preceding vehicle 3 will drive along that route is high, such as e.g. 90%, 99% or 100%.

Received preceding vehicle historical route information may be used together with the received preceding vehicle navigation system information for the determination.

Also other factors may be taken into account during the determination. If the host vehicle 2 receives information from the preceding vehicle 3 that the preceding vehicle 3 needs to refill gasoline within a short distance, and the only gasoline station within the short distance is reached if the preceding vehicle 3 turns right in the next crossing, the arrangement 2 may determine that the probability that the preceding vehicle 3 will turn right is high.

Illustrated in the FIG. 1 embodiment is also the processing unit 6. The processing unit 6 is arranged to receive information from the detector 4, indicative of at least one of a closing velocity between the host vehicle and the preceding vehicle and a distance between the host vehicle and the preceding vehicle.

The processing unit 6 may be a central processor/processing unit, CPU. A CPU may be hardware that carries out instructions of a computer program/software when this is executed by performing basic arithmetical, logical, and input/output operations. The processing unit 6 may also comprise an accelerated/advanced processing unit, APU. An APU may include additional processing capability designed to accelerate one or more types of computations outside of a CPU. The processing unit 6 may also comprise an application programming interface, API, which specifies how software components may interact with each other.

The processing unit 6 is arranged to trigger the communication unit 5 to receive information on a probable route of the preceding vehicle 3 if a detected closing velocity between the host vehicle 2 and the preceding vehicle 3 is above a threshold closing velocity or if a detected distance between the host vehicle 2 and the preceding vehicle 3 is below a threshold distance.

The processing unit 6 is also arranged to determine, for one or more routes ahead of the host vehicle 2, the probability that the preceding vehicle 3 will drive along the one or more routes, and to process the received information into a format suitable for display.

The arrangement 1 further comprises one or more display units 7, arranged to receive determined preceding vehicle route information from the processing unit 6 and to display the processed information such that a vehicle driver is supported. In the FIG. 1 embodiment a head up display 7a, a driver information display 7b and a display 7c arranged in the vicinity of a dashboard/centerstack are illustrated. The information indicative of the probable route may be displayed selectively on one or more of the displays such that a vehicle driver may receive the information. The embodiment illustrated in FIG. 1 also comprises a positioning system 8 connected to a map database 9, and arranged to continuously determine a host vehicle position.

According to some embodiments, the one or more display units 7 are arranged to display the information indicative of a determined host vehicle route graphically. A first graphical element 10a is used to represent the probability that the preceding vehicle 3 will drive along a first route 11a, and a second graphical element 10b is used to represent the probability that the preceding vehicle will drive along a second route 11b.

According to the FIG. 1 illustration, the probability that the preceding vehicle 3 will turn right and follow the second route 11b is determined to be 10%. This probability is illustrated on the display 7c. The probability that the preceding vehicle 3 will continue on the first route 11a is determined to be 85%, and the probability that the preceding vehicle will turn to the left on a third (not shown) upcoming route is determined to be 5%. At least when the preceding vehicle 3 has passed a route, the probabilities that the preceding vehicle 3 will continue on other routes are updated.

In some embodiments, the host vehicle positioning system 8 may be arranged to receive a host vehicle route, e.g., inputted by a vehicle occupant or based on historical route data. The processing unit 6 will then be arranged to compare the host vehicle route with the determined routes of the one or more preceding vehicles 3. The one or more display units 7 are then arranged to display information indicative of a distance for which the two or more routes coincide.

According to some embodiments, the host vehicle positioning system 8 is arranged to receive a host vehicle route, e.g., inputted by a vehicle occupant or based on historical route data. The processing unit 6 is then arranged to compare the host vehicle route with the determined routes of the one or more preceding vehicles 3. The one or more display units 7 will further be arranged to display information indicative of the probability that the one or more preceding vehicles 3 will drive along the host vehicle route for any selected distance along the host vehicle route.

In some embodiments, the one or more display units 7 are arranged to display the processed information only if a, by the detector 4, detected distance between the host vehicle 2 and the preceding vehicle 3 is below a threshold distance. A display unit 7 otherwise displaying other information may then instead be arranged to display the preceding vehicle route information.

Figure 2:
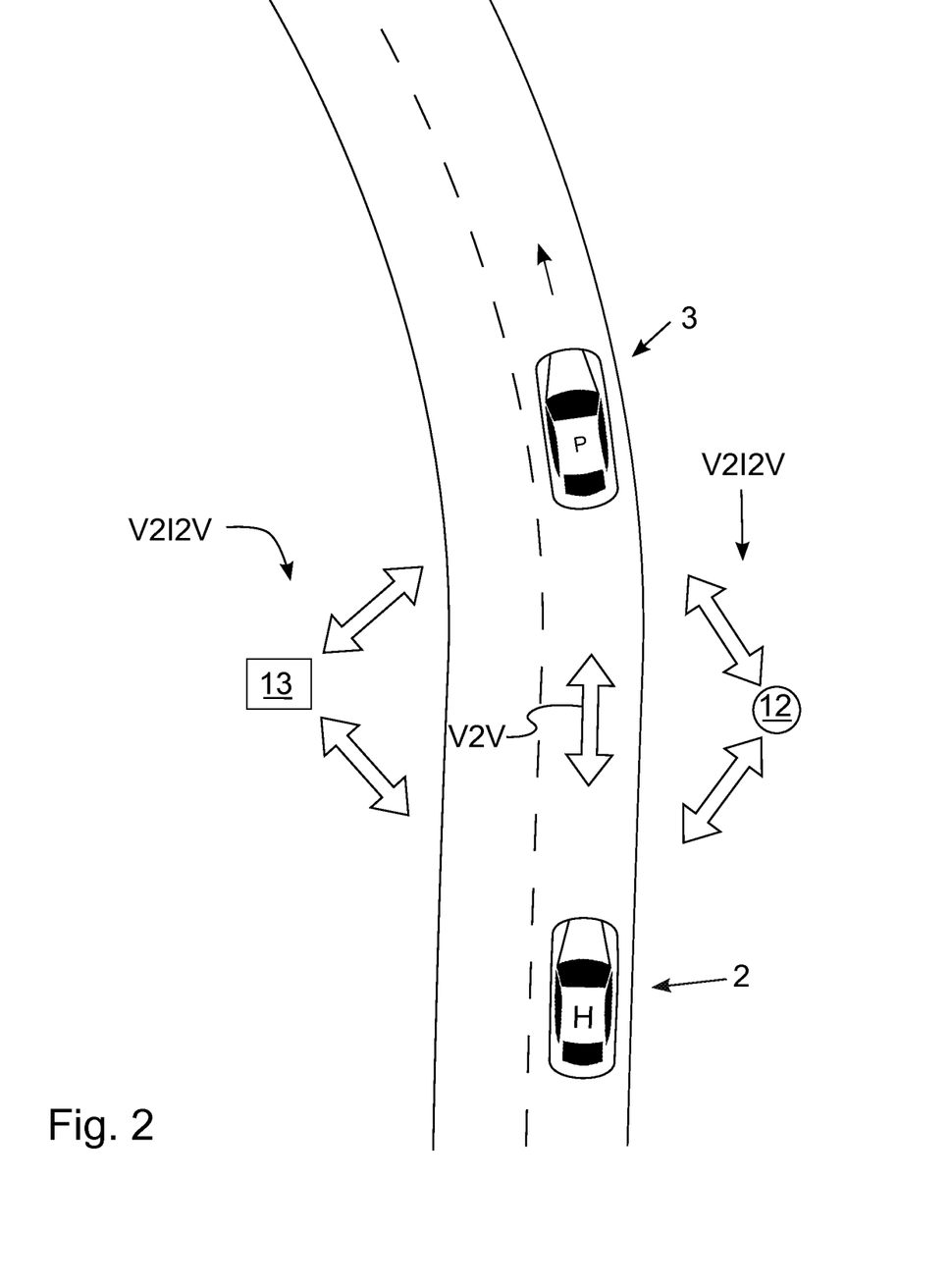
FIG. 2 illustrates an overtaking scenario with a host vehicle and a preceding vehicle according to some alternative embodiments.

FIG. 2 illustrates a host vehicle 2 and a preceding vehicle 3 in a road environment.

A communication unit in the host vehicle 2 is arranged to receive information on a probable route of the preceding vehicle 3 from the surrounding vehicle 3. As illustrated in FIG. 2, the information may be communicated via V2V-communication and/or V2I2V-communication. For V2V-communication, e.g., a standardized protocol for information exchange between vehicles, 802.11p may be used.

For the V2I2V-communication, one or more roadside units 12 may be used, which are arranged to transmit communication between vehicles driving along a road. The roadside units will comprise transmitters/receivers for the communication and will be arranged along a road or road network.

For the V2I2V-communication, one or more external servers 13 will normally be used. The servers 13 comprise or are connected to transmitters/receivers such that they may transmit information between vehicles. The one or more servers 13 may also may be referred to as a cloud.

A mobile network, such as 3G or 4G/LTE can be used for the communication between the host vehicle 2 and the roadside units 12, the servers 13 and/or surrounding vehicles such as the preceding vehicle 3. According to some embodiments, a combination of V2V and V2I2V will be used. V2V will then be used when a distance between vehicles is relatively small and V2I2V may be used for communication over longer distances.

According to some embodiments the communication unit in the host vehicle 2 is arranged to transmit signals indicative of host vehicle route information. Hereby drivers of vehicles rear of the host vehicle may use the information for overtaking decisions.

According to some other embodiments the communication unit is arranged to send a request to the one or more preceding vehicles 3 in order to receive the information on the one or more probable routes for the one or more preceding vehicles 3.

Figure 3:
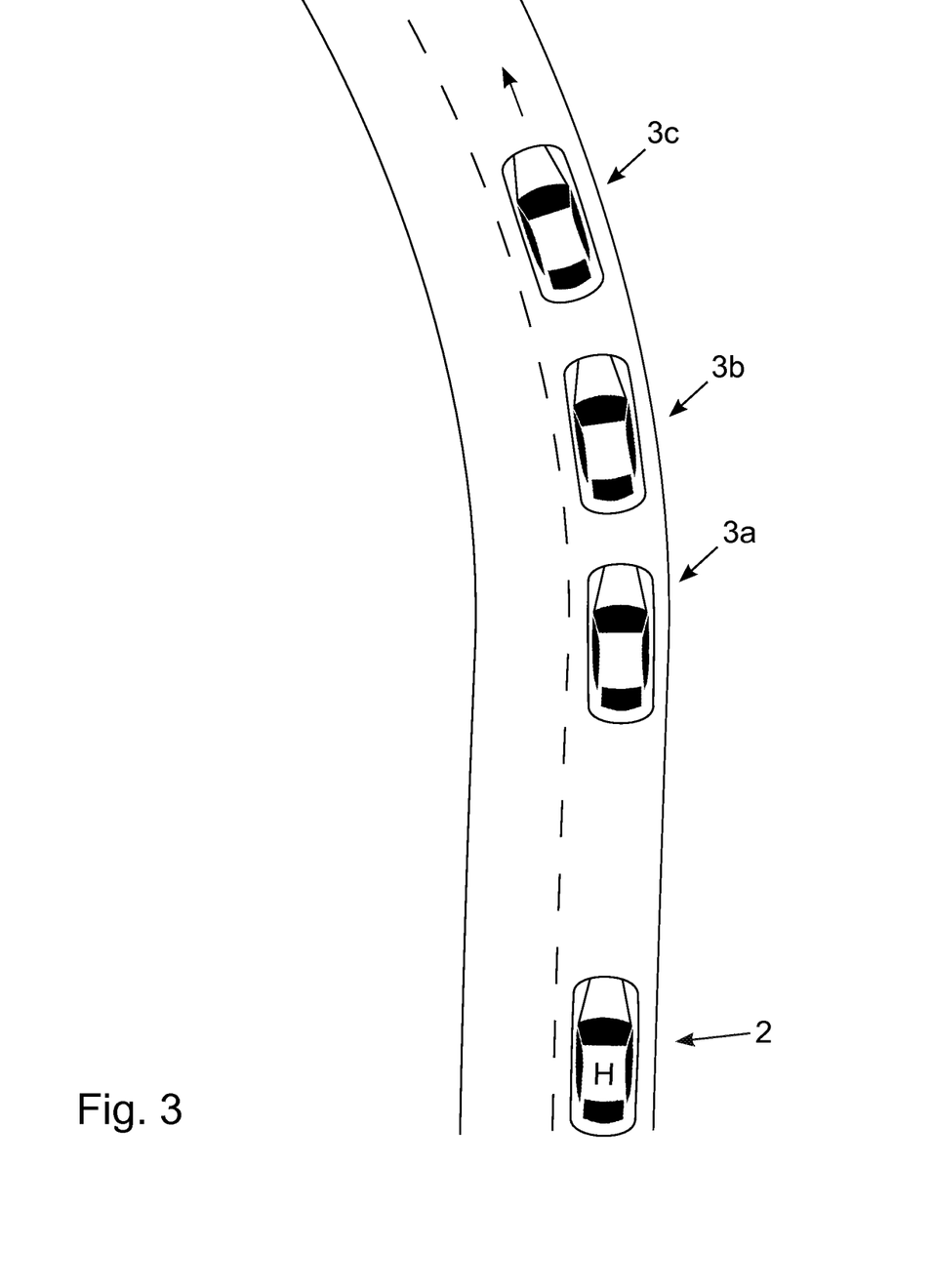
FIG. 3 illustrates an overtaking scenario with a host vehicle and three preceding vehicles according to some further embodiments.

In FIG. 3 is illustrated a scenario where the host vehicle 2 approaches three preceding vehicles 3a, 3b, 3c from the rear. The host vehicle 2 comprises an arrangement for providing vehicle driver support as described above. Preceding vehicle 3a is closest to the host vehicle 2 and preceding vehicle 3c is farthest away from the host vehicle 2.

The detector of the arrangement in the host vehicle 2 is arranged to detect at least one of a closing velocity between the host vehicle 2 and a preceding vehicle 3 and a distance between the host vehicle 2 and a preceding vehicle 3. The detector may detect the closing velocity/the distance to the closest preceding vehicle 3a.

The communication unit of the arrangement in the host vehicle 2 is arranged to receive from the preceding vehicles 3a, 3b, 3c information of one or more probable routes of the preceding vehicles 3a, 3b, 3c based on at least one of received preceding vehicles 3a, 3b, 3c historical route information and received preceding vehicles 3a, 3b, 3c navigation system information.

The processing unit of the arrangement in the host vehicle 2 is arranged to receive from the detector information indicative of at least one of a closing velocity between the host vehicle 2 and the preceding vehicles 3a, 3b, 3c and a distance between the host vehicle 2 and the preceding vehicles 3a, 3b, 3c. The processing unit may then trigger the communication unit to receive information on one or more probable routes of the preceding vehicles 3a, 3b, 3c if a detected closing velocity between the host vehicle 2 and one of the preceding vehicles 3a, 3b, 3c, such as the closest preceding vehicle 3a, is above a threshold closing velocity. Alternatively the processing unit may then trigger the communication unit to receive information on one or more probable routes of the preceding vehicles 3a, 3b, 3c if a detected distance between the host vehicle 2 and a preceding vehicle 3a, 3b, 3c, such as the closest preceding vehicle 3a, is below a threshold distance. A threshold closing velocity and/or a threshold distance may be pre-configured or user-configured, and may be any suitable velocity/distance.

The processing unit of the arrangement in the host vehicle 2 is arranged to determine, for one or more routes ahead of the host vehicle 2, the probability that the preceding vehicle 3a, 3b, 3c will drive along the one or more routes. The determination is based on at least one of received preceding vehicles historical route information data and received preceding vehicles navigation system information. The processing unit of the arrangement in the host vehicle 2 will then process the received information into a format suitable for display.

One or more display units of the arrangement in the host vehicle 2 will receive determined preceding vehicles route information from the processing unit and display the processed information such that a host vehicle driver will be supported in his/her decisions whether to initiate an overtake or not.

Since probable routes for the three preceding vehicle 3a, 3b, 3c are displayed, the host vehicle driver will receive information indicative of a distance for which the host vehicle routes coincide with determined routes for the preceding vehicles 3a, 3b, 3c. The probabilities that the preceding vehicles 3a, 3b, 3c will drive along a specific route respectively, such as the host vehicle route, will be used for determination of an aggregated probability that some or all of the preceding vehicles 3 will drive along the specific route for any selected distance.

In the FIG. 3 illustrated embodiment three preceding vehicles 3a, 3b, 3c are illustrated, but in other embodiment's probable routes for any other numbers of preceding vehicles may be determined.

Figure 4:
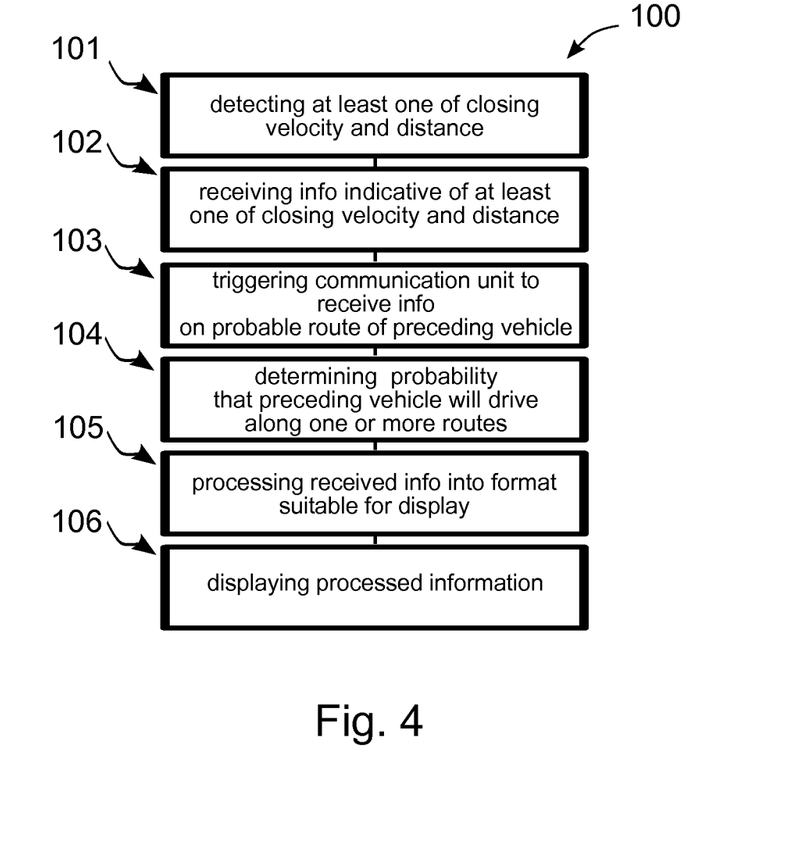
FIG. 4 illustrates a method for providing a vehicle driver support during manual or semi-autonomous driving in a potential overtake scenario.

FIG. 4 illustrates a method 100 for providing vehicle driver support during manual or semi-autonomous driving in a potential overtake scenario, characterized in that the method comprises;

detecting 101, by a detector, at least one of a closing velocity between the host vehicle and the preceding vehicle and a distance between the host vehicle and the preceding vehicle;

receiving 102, to the processing unit, information indicative of at least one of a closing velocity between the host vehicle and the preceding vehicle and a distance between the host vehicle and the preceding vehicle from the detector;

triggering 103, by the processing unit, the communication unit to receive information on a probable route of a preceding vehicle based on at least one of preceding vehicle historical route information and preceding vehicle navigation system information from the preceding vehicle if a detected closing velocity between the host vehicle and the preceding vehicle is above a threshold closing velocity or if a detected distance between the host vehicle and the preceding vehicle is below a threshold distance;

determining 104, by the processing unit, for one or more routes ahead of the host vehicle the probability that the preceding vehicle will drive along the one or more route, the determination being based on at least one of received preceding vehicle historical route information data and received preceding vehicle navigation system information;

processing 105, the received information into a format suitable for display;

displaying 106, by the one or more display units, the processed information.

Although the aspects have been described with reference to example embodiments, many different alterations, modifications and the like will become apparent for those skilled in the art. Therefore, it is to be understood that the foregoing is illustrative of various example embodiments and the scope of the appended claims is not to be limited to the specific embodiments disclosed and that modifications to the disclosed embodiments, combinations of features of disclosed embodiments as well as other embodiments are intended to be included within the scope of the appended claims.

As used herein, the term "comprising" or "comprises" is open-ended, and includes one or more stated features, elements, steps, components or functions but does not preclude the presence or addition of one or more other features, elements, steps, components, functions or groups thereof.

What is claimed is:

1. An arrangement in a host vehicle for providing vehicle driver support during manual or semi-autonomous driving in a potential overtake scenario, the arrangement comprising:

a detector arranged to detect at least one of a closing velocity between the host vehicle and a preceding vehicle and a distance between the host vehicle and the preceding vehicle;

a communication unit arranged to receive from the preceding vehicle information of a probable route of the preceding vehicle based on at least one of preceding vehicle historical route information and preceding vehicle navigation system information, wherein the preceding vehicle navigation system information comprises route information that has been input into a navigation system of the preceding vehicle;

a processing unit arranged to receive information indicative of at least one of a closing velocity between the host vehicle and the preceding vehicle and a distance between the host vehicle and the preceding vehicle from the detector, trigger the communication unit to receive information on a probable route of the preceding vehicle if a detected closing velocity between the host vehicle and the preceding vehicle is above a threshold closing velocity or if a detected distance between the host vehicle and the preceding vehicle is below a threshold distance, determine, for one or more routes ahead of the host vehicle, probability that the preceding vehicle will drive along the one or more routes, the determination being based on at least one of received preceding vehicle historical route information and received preceding vehicle navigation system information, and to process the received information into a format suitable for display;

one or more display units arranged to receive and display the processed information, to thereby provide support to the vehicle driver.

2. The arrangement according to claim 1 wherein the processing unit is configured to determine probable routes of two or more preceding vehicles.

3. The arrangement according to claim 1 wherein the communication unit is arranged to send a request to the preceding vehicle in order to receive the information on the probable route of the preceding vehicle.

4. The arrangement according to claim 1 wherein the communication unit is arranged to communicate with other vehicles via vehicle-to-vehicle-communication (V2V).

5. The arrangement according to claim 1 wherein the communication unit is arranged to communicate with other vehicles via vehicle-to-infrastructure-to-vehicle-communication (V2I2V).

6. The arrangement according to claim 1 wherein the one or more display units is/are arranged to display the processed information only if a detected distance, detected by the detector, between the host vehicle and the preceding vehicle is below a threshold distance.

7. The arrangement according to claim 1 further comprising a positioning system connected to a map database and arranged to continuously determine vehicle position.

8. The arrangement according to claim 7 wherein the positioning system is arranged to receive a host vehicle route for the host vehicle, the processing unit is arranged to compare the host vehicle route with the determined one or more routes of the preceding vehicle and the one or more display units is/are arranged to display information indicative of a distance for which the host vehicle route and the determined one more routes coincide.

9. The arrangement according to claim 7 wherein the positioning system is arranged to receive a host vehicle route for the vehicle, the processing unit is arranged to compare the host vehicle route with the determined one or more routes of the preceding vehicle and the one or more display units is/are arranged to display information indicative of a probability that the preceding vehicle will drive along the host vehicle route for any selected distance along the host vehicle route.

10. The arrangement according to claim 1 wherein the one or more display units is/are arranged to display information graphically, and wherein a first graphical element represents a probability that the preceding vehicle will drive along a first route, and a second graphical element represents a probability that the preceding vehicle will drive along a second route.

11. A vehicle comprising the arrangement according to claim 1.

12. The arrangement according to claim 1 wherein the one or more display units is/are arranged to be viewable by the vehicle driver and is/are configured to display the processed information using a first graphical element and a second graphical element, and wherein the first graphical element represents a probability that the preceding vehicle will drive along a first route, and the second graphical element represents a probability that the preceding vehicle will drive along a second route.

13. The arrangement according to claim 1 wherein the processing unit is configured to trigger the communication unit to receive information on the probable route of the preceding vehicle if the detected closing velocity between the host vehicle and the preceding vehicle is above the threshold closing velocity.

14. A method for providing vehicle driver support for a driver of a host vehicle during manual or semi-autonomous driving in a potential overtake scenario, the method comprising:

detecting, by a detector, at least one of a closing velocity between the host vehicle and a preceding vehicle and a distance between the host vehicle and the preceding vehicle;

receiving, by a processing unit, information indicative of at least one of a closing velocity between the host vehicle and the preceding vehicle and a distance between the host vehicle and the preceding vehicle from the detector;

triggering, by the processing unit, a communication unit to receive information on a probable route of the preceding vehicle based on at least one of preceding vehicle historical route information and preceding vehicle navigation system information from the preceding vehicle if a detected closing velocity between the host vehicle and the preceding vehicle is above a threshold closing velocity or if a detected distance between the host vehicle and the preceding vehicle is below a threshold distance, wherein the preceding vehicle navigation system information comprises route information that has been input into a navigation system of the preceding vehicle;

determining, by the processing unit, for one or more routes ahead of the host vehicle probability that the preceding vehicle will drive along the one or more routes, the determination being based on at least one of received preceding vehicle historical route information data and received preceding vehicle navigation system information;

processing the received information into a format suitable for display;

displaying, by one or more display units, the processed information.

15. The method according to claim 14 further comprising sending a request, by the communication unit, to the preceding vehicle to receive the information on the probable route of the preceding vehicle.

16. The method according to claim 14 wherein the communication unit is operable to communicate with other vehicles via vehicle-to-vehicle-communication (V2V).

17. The method according to claim 14 wherein the communication unit is operable to communicate with other vehicles via vehicle-to-infrastructure-to-vehicle-communication (V2I2V).

18. The method according to claim 14 wherein displaying the processed information only occurs if a detected distance between the host vehicle and the preceding vehicle is below a threshold distance.

19. The method according to claim 14 wherein displaying the processed information comprises displaying information graphically using a first graphical element and a second graphical element, and wherein the first graphical element represents a probability that the preceding vehicle will drive along a first route, and the second graphical element represents a probability that the preceding vehicle will drive along a second route.

20. The method according to claim 14 wherein the triggering comprises triggering, by the processing unit, the communication unit to receive information on the probable route of the preceding vehicle based on at least one of preceding vehicle historical route information and preceding vehicle navigation system information from the preceding vehicle if the detected closing velocity between the host vehicle and the preceding vehicle is above the threshold closing velocity.

* * * * *